(12) United States Patent
Kim et al.

(10) Patent No.: US 10,967,910 B2
(45) Date of Patent: Apr. 6, 2021

(54) SIDE SILL STRUCTURE FOR VEHICLE

(71) Applicants: Hyundai Motor Company, Seoul (KR); Kia Motors Corporation, Seoul (KR)

(72) Inventors: Hyun Sik Kim, Seoul (KR); Byeong Cheon Lee, Seoul (KR); Hee Seouk Chung, Hwaseong-si (KR); Deok Hwa Hong, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 125 days.

(21) Appl. No.: 16/535,403

(22) Filed: Aug. 8, 2019

(65) Prior Publication Data
US 2020/0148271 A1    May 14, 2020

(30) Foreign Application Priority Data
Nov. 14, 2018 (KR) .................. 10-2018-0140077

(51) Int. Cl.
*B60R 19/34* (2006.01)
*B62D 21/15* (2006.01)
*B62D 25/02* (2006.01)

(52) U.S. Cl.
CPC ......... *B62D 21/157* (2013.01); *B62D 21/152* (2013.01); *B62D 25/025* (2013.01)

(58) Field of Classification Search
CPC .... B62D 25/025; B62D 25/04; B61D 17/043; B61D 17/10; B61D 7/02; E06B 2009/005; E06B 9/02; E06B 3/00; E05B 81/06; E05B 85/02
See application file for complete search history.

(56) References Cited

U.S. PATENT DOCUMENTS

| | | | | |
|---|---|---|---|---|
| 6,296,300 B1 * | 10/2001 | Sato | ..................... | B62D 21/152 296/187.08 |
| 6,460,918 B1 * | 10/2002 | Sato | ..................... | B62D 21/152 296/193.06 |
| 7,140,674 B2 * | 11/2006 | Miyoshi | ................. | B62D 25/04 296/203.03 |
| 8,469,442 B1 * | 6/2013 | Pencak | .................. | B62D 25/16 296/187.12 |
| 2002/0063445 A1 * | 5/2002 | Takeuchi | ........... | B62D 25/2045 296/204 |
| 2004/0145217 A1 * | 7/2004 | Hanyu | ................. | B62D 25/082 296/204 |
| 2004/0200659 A1 * | 10/2004 | Miyasaka | ............ | B62D 21/155 180/312 |
| 2004/0256890 A1 * | 12/2004 | Nagafuchi | ........... | B62D 21/152 296/203.02 |
| 2005/0067860 A1 * | 3/2005 | Makita | .................... | B60R 19/24 296/203.02 |
| 2010/0072789 A1 * | 3/2010 | Boettcher | .......... | B62D 25/2018 296/209 |
| 2013/0126255 A1 * | 5/2013 | Saeki | .................. | B62D 21/152 180/68.5 |

(Continued)

*Primary Examiner* — Kiran B Patel
(74) *Attorney, Agent, or Firm* — Slater Matsil, LLP

(57) ABSTRACT

A side sill structure can be used for a vehicle. The side sill structure includes a side sill extending along a longitudinal direction of the vehicle; and a front connection member connects a front side member located at a front side of the side sill to a front end of the side sill.

14 Claims, 23 Drawing Sheets

(56) References Cited

U.S. PATENT DOCUMENTS

| | | | |
|---|---|---|---|
| 2014/0001790 A1* | 1/2014 | Zischke | B62D 25/2018 296/187.03 |
| 2016/0052554 A1* | 2/2016 | Ozawa | B62D 25/082 296/187.09 |
| 2016/0059892 A1* | 3/2016 | Lee | B62D 25/025 296/187.09 |
| 2017/0073013 A1* | 3/2017 | Sasaki | B62D 29/008 |
| 2017/0088189 A1* | 3/2017 | Saeki | B62D 25/20 |
| 2017/0096170 A1* | 4/2017 | Sasaki | B62D 21/155 |
| 2018/0251157 A1* | 9/2018 | Yoshimoto | B62D 21/03 |
| 2019/0092396 A1* | 3/2019 | Abe | B62D 25/20 |
| 2020/0047810 A1* | 2/2020 | Ayukawa | B62D 25/025 |
| 2020/0062313 A1* | 2/2020 | Tashiro | B62D 25/082 |
| 2020/0148146 A1* | 5/2020 | Chung | B60R 19/18 |
| 2020/0317272 A1* | 10/2020 | Hong | B62D 25/08 |

\* cited by examiner

SIDE SILL STRUCTURE FOR VEHICLE

CROSS-REFERENCE TO RELATED APPLICATIONS

This application claims priority to Korean Patent Application No. 10-2018-0140077, filed in the Korean Intellectual Property Office on Nov. 14, 2018, which application is hereby incorporated herein by reference.

TECHNICAL FIELD

The present disclosure relates to a side sill structure for a vehicle.

BACKGROUND

A vehicle includes a pair of side sills disposed on the left and right sides of a floor. Each side sill has an inner side sill coupled to the edge of the floor, an outer side sill facing the outside of the vehicle, and a plurality of reinforcing members interposed between the inner side sill and the outer side sill. The plurality of reinforcing members may be spaced apart from each other at predetermined intervals in a longitudinal direction of the side sill.

A front end of each side sill may be coupled to a rear end of a front side member, and a rear end thereof may be coupled to a front end of a rear side member. The side sills serve to protect a passenger compartment from side collisions and frontal collisions of the vehicle.

However, existing side sills are relatively vulnerable to side collisions as the reinforcing members are spaced apart from each other.

In addition, the existing side sills have no structure for transmitting a force between the spaced reinforcing members in the event of a frontal collision, and thus an impact load generated in the frontal collision may not be transmitted properly in the longitudinal direction of the side seals.

In an electric vehicle or a hybrid vehicle in which a battery is mounted on the floor side, a connection portion between the front end of the side sill and the rear end of the front side member may easily be broken in the event of collisions, and thus the rear end of the front side member may hit the battery, increasing the probability of occurrence of fire, resulting in a disadvantage to passenger protection.

The above information described in this background section is provided to assist in understanding the background of the inventive concept, and may include any technical concept which is not considered as the prior art that is already known to those skilled in the art.

SUMMARY

The present disclosure relates to a side sill structure for a vehicle. Particular embodiments relate to a side sill structure for a vehicle, capable of uniformly distributing impact energy in the event of a frontal collision and a side collision.

Embodiments of the present disclosure can solve problems occurring in the prior art while advantages achieved by the prior art are maintained intact.

An aspect of the present disclosure provides a side sill structure for a vehicle, capable of uniformly distributing impact energy in the event of frontal collisions and side collisions, thereby safely protecting a driver and passengers from the collisions.

According to an aspect of the present disclosure, a side sill structure for a vehicle may include a side sill extending along a longitudinal direction of the vehicle; and a front connection member connecting between a front end of the side sill and a front side member located at a front side of the side sill.

The side sill may include a matching flange that is coupled to a floor of the vehicle.

The side sill may further include an inner extension rib that is substantially flush with the matching flange.

The inner extension rib may extend along a width of the side sill.

The front connection member may include a matching flange which is coupled to the floor of the vehicle.

The front connection member may further include an inner extension rib which is substantially flush with the matching flange.

The matching flange of the front connection member may be substantially flush with the matching flange of the side sill.

The inner extension rib of the front connection member may be substantially flush with the inner extension rib of the side sill.

The front connection member may include a first connection portion connected to a rear end of the front side member, and a second connection portion connected to the front end of the side sill.

The second connection portion may include an outer support wall that contacts the front end of the side sill, and wherein the outer support wall may have a cross-sectional shape that is substantially the same as an outer cross-sectional contour of the side sill.

According to another aspect of the present disclosure, a side sill structure for a vehicle may include a side sill extending along a longitudinal direction of the vehicle; and a rear connection member connecting between a rear end of the side sill and a rear extension member located at rear side of the side sill.

The side sill may include a matching flange that is coupled to a floor of the vehicle.

The side sill may further include an inner extension rib that is substantially flush with the matching flange.

The inner extension rib may extend along a width the side sill.

The rear connection member may include a matching flange that is coupled to the floor of the vehicle.

The rear connection member may further include an inner extension rib that is substantially flush with the matching flange.

The matching flange of the rear connection member may be substantially flush with the matching flange of the side sill.

The inner extension rib of the rear connection member may be substantially flush with the inner extension rib of the side sill.

The rear connection member may include a third connection portion connected to the rear end of the side sill, and a fourth connection portion connected to a front end of the rear extension member.

The third connection portion may include an outer support wall that contacts the rear end of the side sill, and wherein the outer support wall may have a cross-sectional shape that is substantially the same as an outer cross-sectional contour of the side sill.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
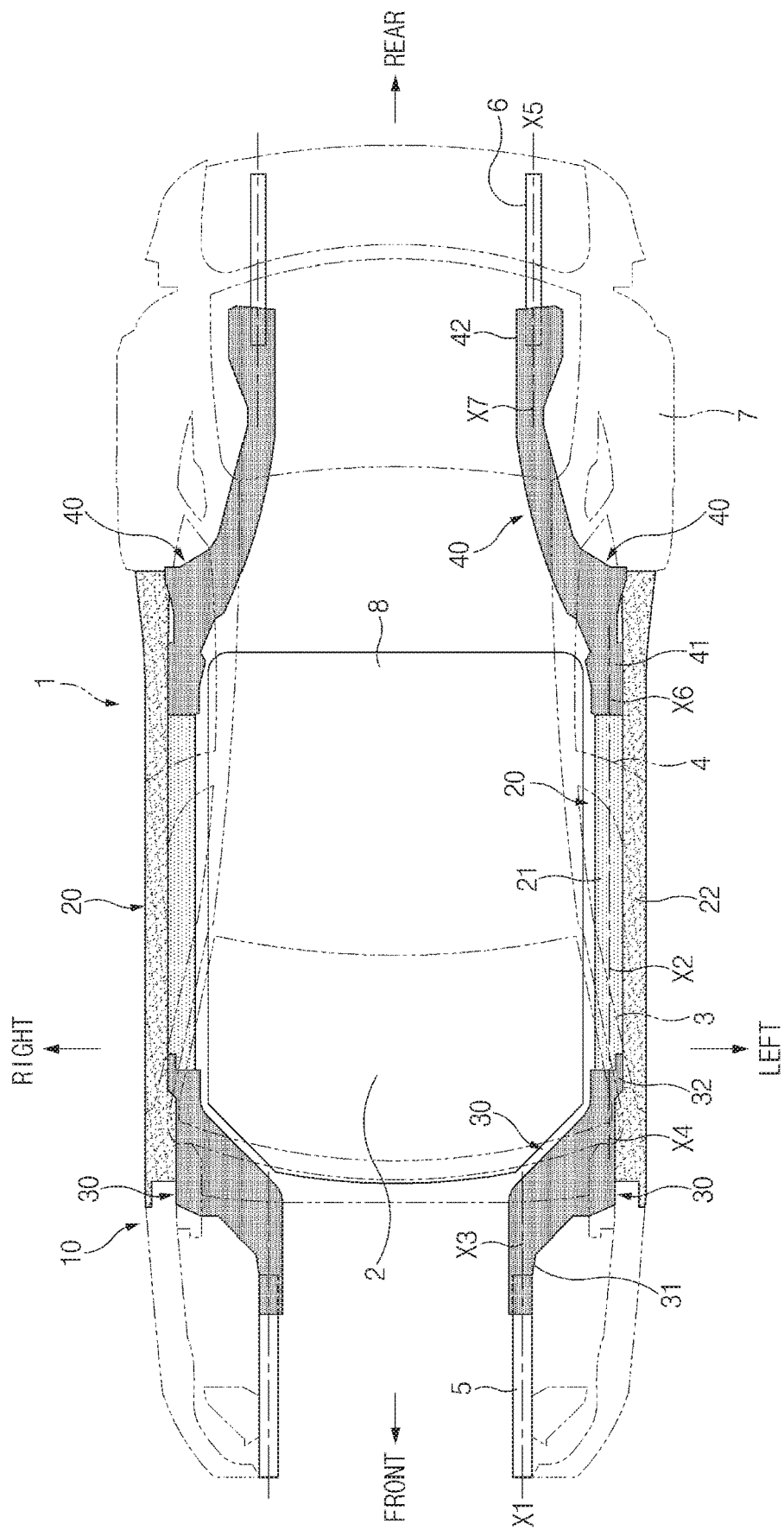
FIG. 1 illustrates a plan view of a vehicle to which a side sill structure for a vehicle according to an exemplary embodiment of the present disclosure is applied.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
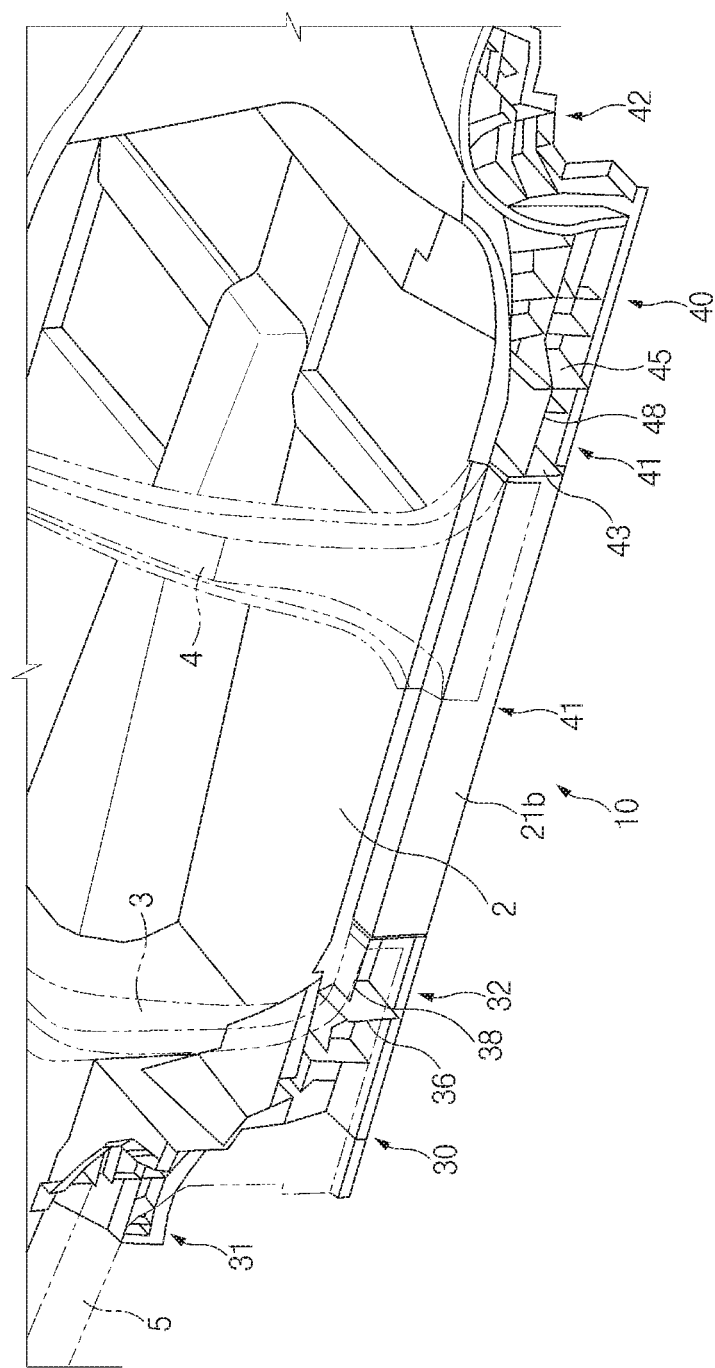
FIG. 2 illustrates a perspective view of a side sill structure for a vehicle according to an exemplary embodiment of the present disclosure.

Referring to FIGS. 1 and 2, a side sill structure 10 for a vehicle according to an exemplary embodiment of the present disclosure may include a pair of side sills 20 disposed on the left and right sides of a floor 2 of a vehicle 1, a pair of front connection members 30 connected to front ends of the side sills 20, respectively, and a pair of rear connection members 40 connected to rear ends of the side sills 20, respectively.

Figure 3A:
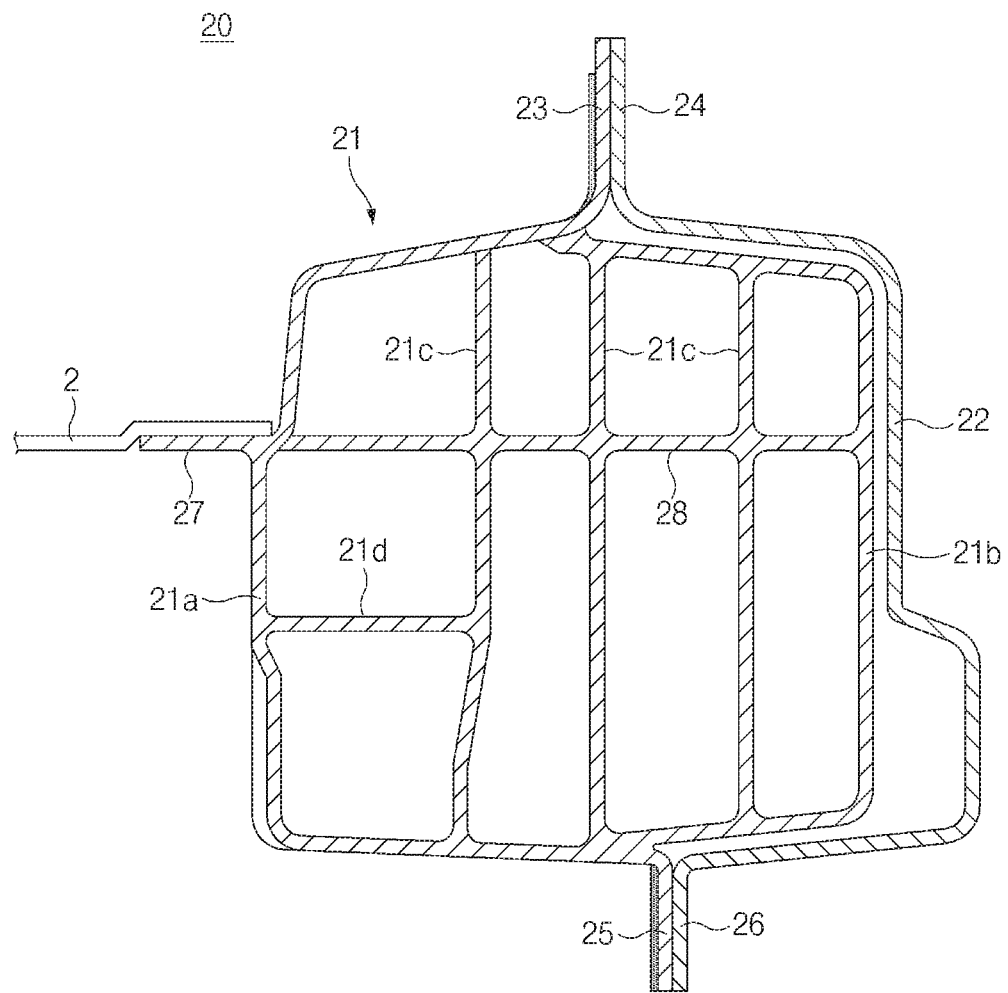
FIG. 3A illustrates a cross-sectional view of a side sill in a side sill structure for a vehicle according to an exemplary embodiment of the present disclosure.

The pair of side sills 20 may spaced apart along a transverse direction of the vehicle 1. Each side sill 20 may extend along a longitudinal direction of the vehicle 1. As illustrated in FIG. 3A, each side sill 20 may include an inner side sill 21 and an outer side sill 22 coupled to the inner side sill 21.

Referring to FIG. 3A, the inner side sill 21 may have a top flange 23 extending upwardly from a top end thereof and a bottom flange 25 extending downwardly from a bottom end thereof, and the top and bottom flanges 23 and 25 may extend vertically. The outer side sill 22 may have a top flange 24 extending upwardly from a top end thereof and a bottom flange 26 extending downwardly from a bottom end thereof, and the top and bottom flanges 24 and 26 may extend vertically. The top and bottom flanges 23 and 25 of the inner side sill 21 may be coupled to the top and bottom flanges 24 and 26 of the outer side sill 22 by using fasteners and/or welding, respectively.

The outer side sill 22 may be longer than the inner side sill 21, and the front connection member 30, the inner side sill 21, and the rear connection member 40 may be coupled to the outer side sill 22.

The inner side sill 21 may include an inboard side portion 21a facing the interior space of the vehicle 1, and an outboard side portion 21b facing the outside of the vehicle 1.

The inboard side portion 21a may have a C-shaped cross-section, and the outboard side portion 21b may have a C-shaped cross-section. The inner side sill 21 may have a closed cross-section defined by the inboard side portion 21a and the outboard side portion 21b. In particular, the inner side sill 21 may have a plurality of ribs 21c and 21d disposed between the inboard side portion 21a and the outboard side portion 21b. The plurality of ribs 21c and 21d may extend in a longitudinal direction of the inner side sill 21. The plurality of ribs 21c and 21d may strengthen stiffness of the inner side sill 21 so that an impact load generated in a side collision of the vehicle may be uniformly distributed through the plurality of ribs 21c and 21d. According to an exemplary embodiment, the plurality of ribs 21c and 21d may include one or more vertical ribs 21c extending vertically, and one or more horizontal ribs 21d extending horizontally, as illustrated in FIG. 3A.

The inboard side portion 21a may have a matching flange 27 which is matched to the floor 2 of the vehicle 1, and the matching flange 27 of the inboard side portion 21a may be coupled to the floor 2 by welding and/or using fasteners. In particular, the matching flange 27 may extend horizontally to match and couple with the floor 2 so that the matching flange 27 of the inner side sill 21 may be firmly coupled to the floor 2 of the vehicle 1.

The inner side sill 21 may further include an inner extension rib 28 which is substantially flush with the matching flange 27, and the inner extension rib 28 may be disposed within the inner side sill 21. The inner extension rib 28 may extend horizontally in a width direction of the inner side sill 21 to connect the inboard side portion 21a to the outboard side portion 21b, and the inner extension rib 28 may extend through the plurality of vertical ribs 21c. Thus, the inner extension rib 28 may be integrally connected to the inboard side portion 21a, the outboard side portion 21b, and the plurality of vertical ribs 21c. The extension rib 28, the inboard side portion 21a, the outboard side portion 21b, the plurality of vertical ribs 21c, and the one or more horizontal ribs 21d are formed as a unitary one-piece structure.

In addition, the inner extension rib 28 may extend in the longitudinal direction of the inner side sill 21.

According to an exemplary embodiment, the inner extension rib 28 may be flush with the matching flange 27 as illustrated in FIG. 3A.

Figure 3B:
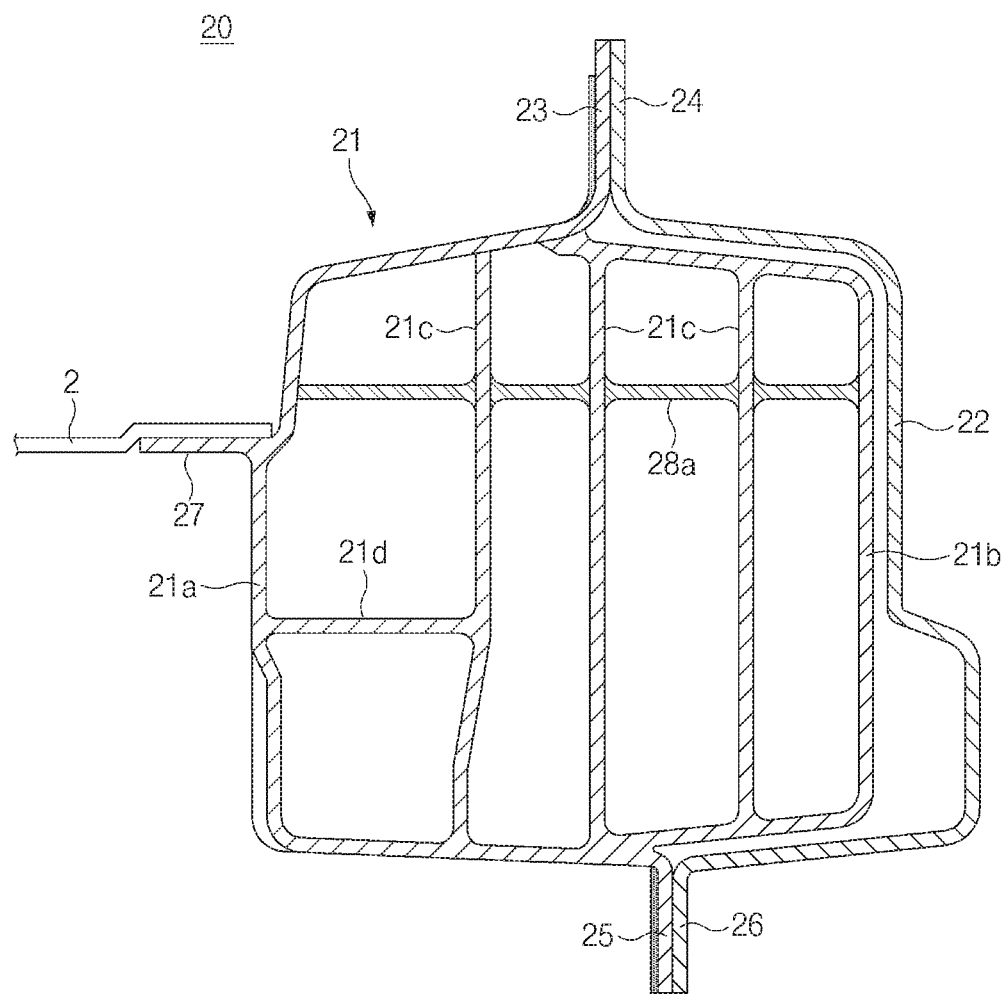
FIG. 3B illustrates a modified embodiment of FIG. 3A.

According to another exemplary embodiment, an inner extension rib 28a may be offset upwardly with respect to the matching flange 27 by a predetermined distance as illustrated in FIG. 3B.

Figure 3C:
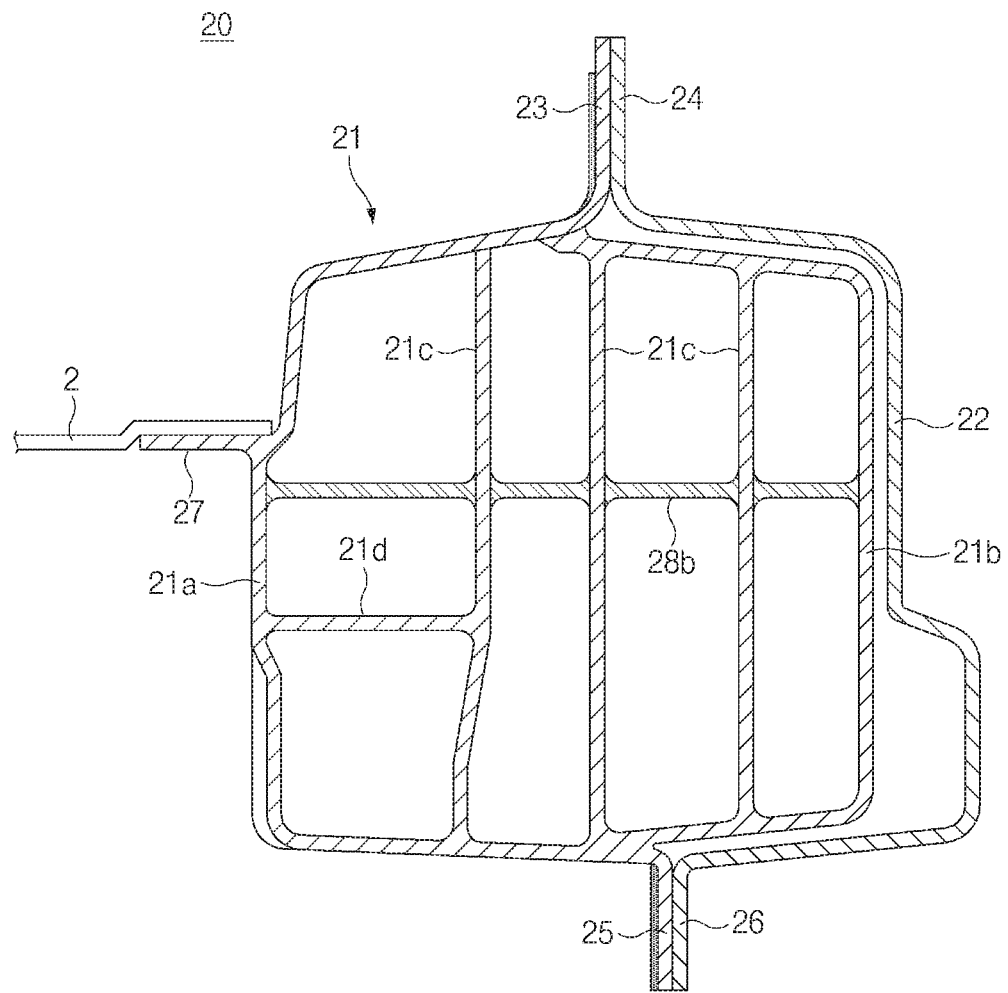
FIG. 3C illustrates another modified embodiment of FIG. 3A.

According to another exemplary embodiment, an inner extension rib 28b may be offset downwardly with respect to the matching flange 27 by a predetermined distance as illustrated in FIG. 3C.

Figure 4:
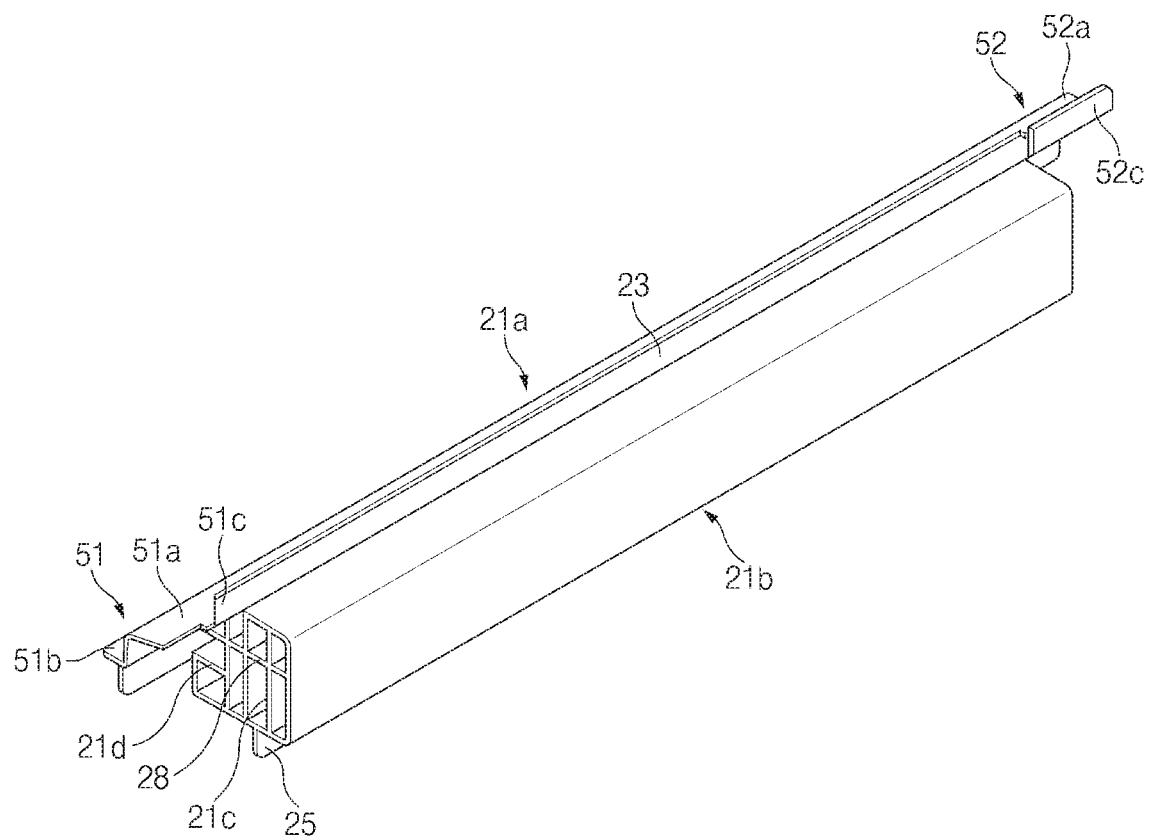
FIG. 4 illustrates a perspective view of an inner side sill in a side sill structure for a vehicle according to an exemplary embodiment of the present disclosure.

Referring to FIG. 4, the inner side sill 21 may have a front extension 51 extending from the front end of the inner side sill 21 toward the front of the vehicle, and a rear extension 52 extending from the rear end of the inner side sill 21 toward the rear of the vehicle.

Figure 6:
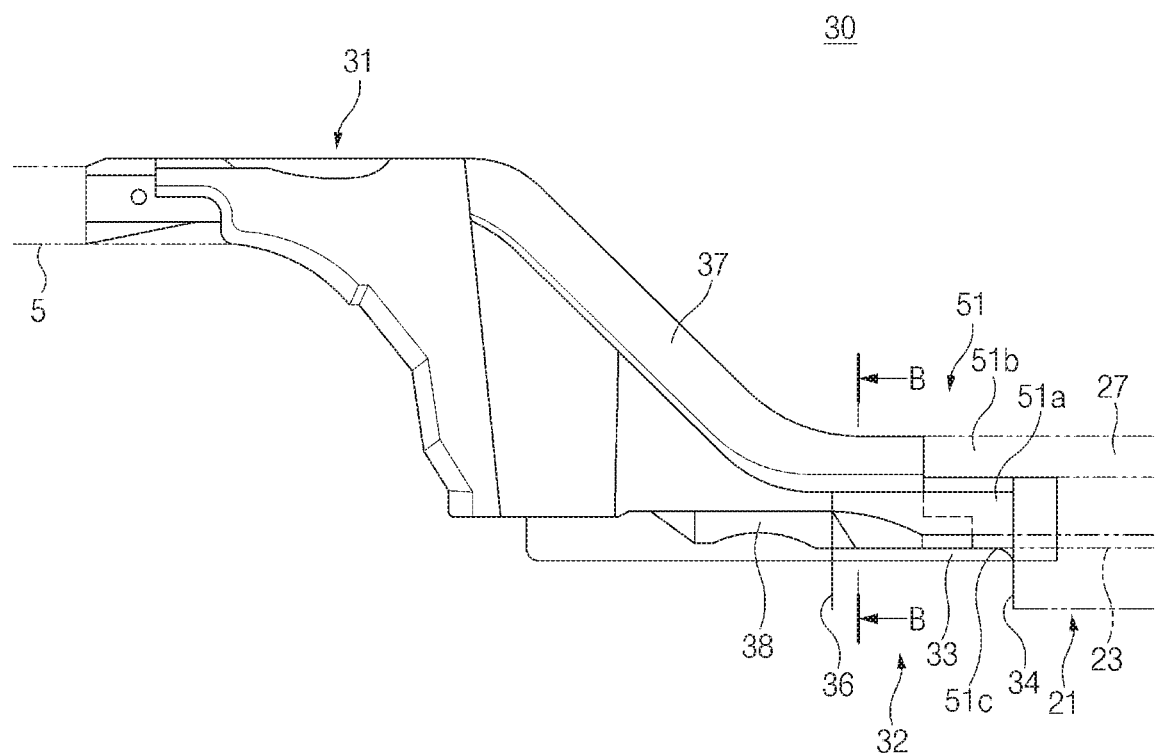
FIG. 6 illustrates a view in a direction of arrow A of FIG. 5.
Figure 10:
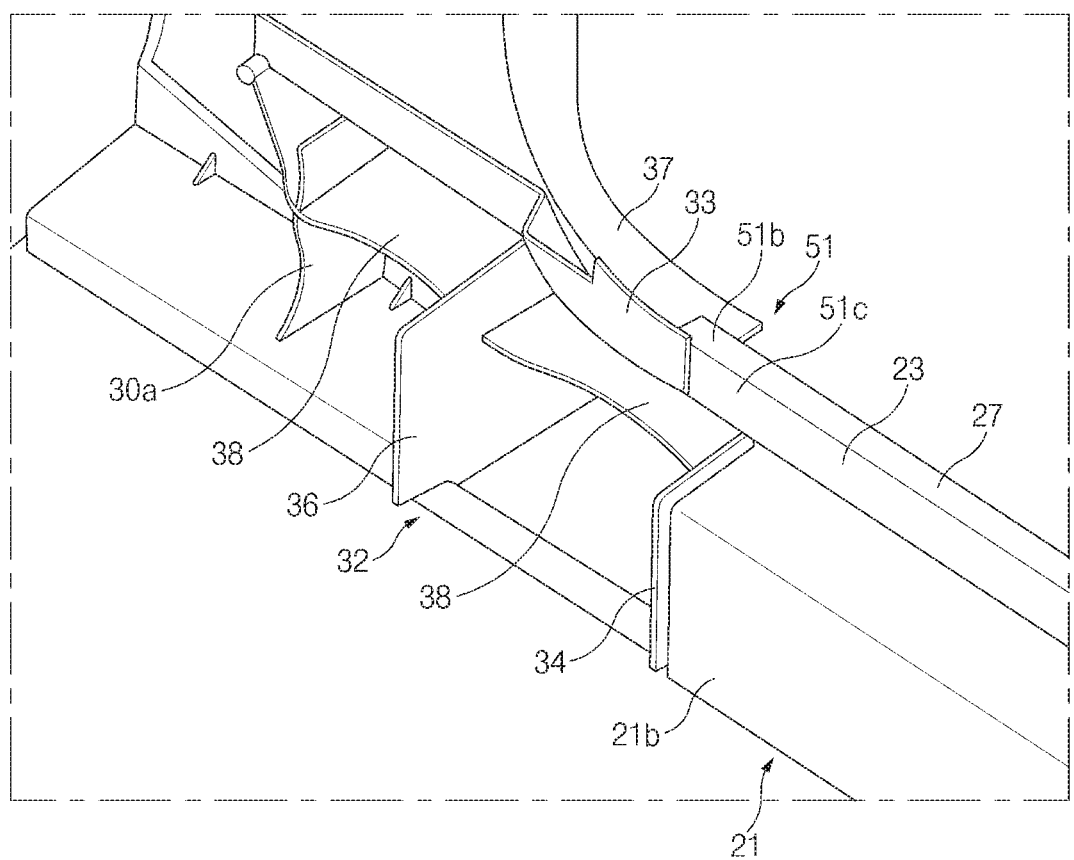
FIG. 10 illustrates a perspective view of a structure in which a second connection portion of a front connection member and a front end of an inner side sill are connected in a side sill structure for a vehicle according to an exemplary embodiment of the present disclosure, which is viewed from the top of the side sill structure.
Figure 11:
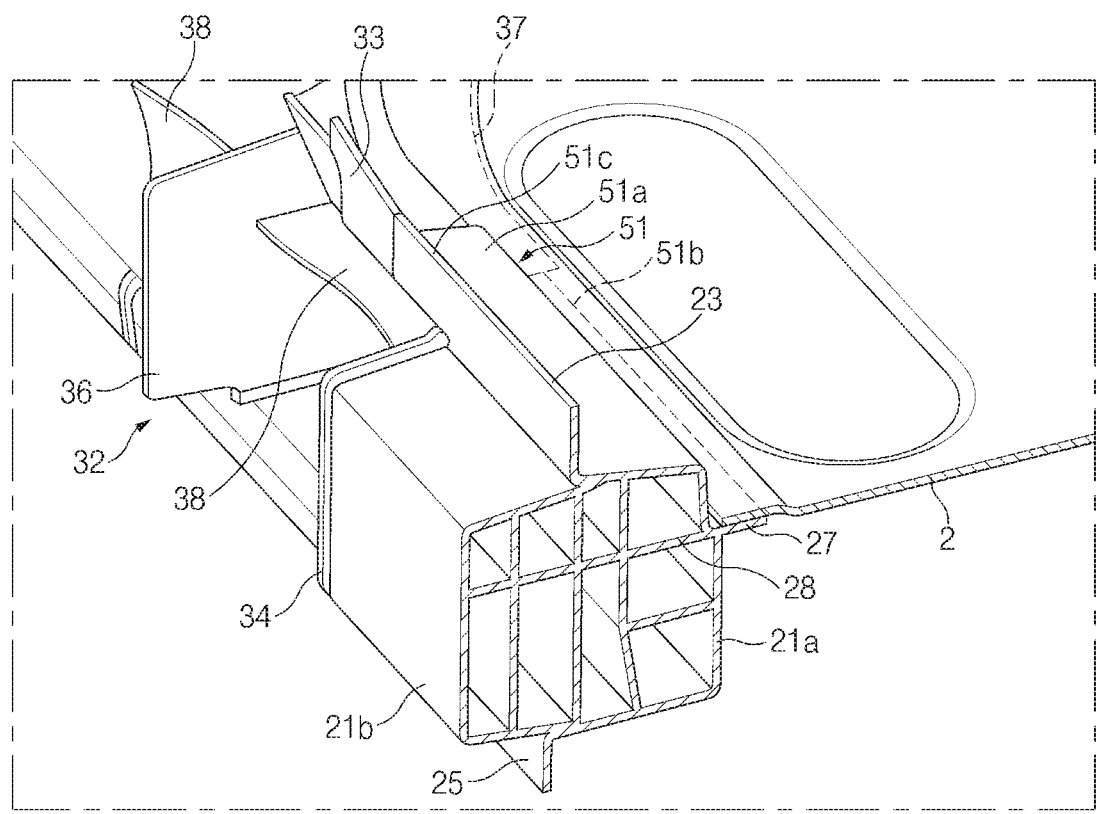
FIG. 11 illustrates a partially cut-away perspective view of a structure in which a second connection portion of a front connection member and a front end of an inner side sill are connected in a side sill structure for a vehicle according to an exemplary embodiment of the present disclosure.

Referring to FIG. 4, the front extension 51 may extend from a front end of the inboard side portion 21a of the inner side sill 21 and a front end of the matching flange 27 toward the front of the vehicle. The front extension 51 may include a first extension portion 51a extending from the inboard side portion 21a of the inner side sill 21 toward the front of the vehicle, a second extension portion 51b extending from the matching flange 27 of the inner side sill 21 toward the front of the vehicle, and a third extension portion 51c extending from the top flange 23 of the inner side sill 21 toward the front of the vehicle. As illustrated in FIGS. 6, 10, and 11, the front extension 51 of the inner side sill 21 may abut and overlap an inboard side portion of a second connection portion 32 of the front connection member 30, and the front extension 51 of the inner side sill 21 may be coupled to the second connection portion 32 of the front connection member 30 by welding and/or using fasteners.

Referring to FIG. 4, the rear extension 52 may extend from a rear end of the inboard side portion 21a of the inner side sill 21 and a rear end of the matching flange 27 toward the rear of the vehicle.

Figure 13:
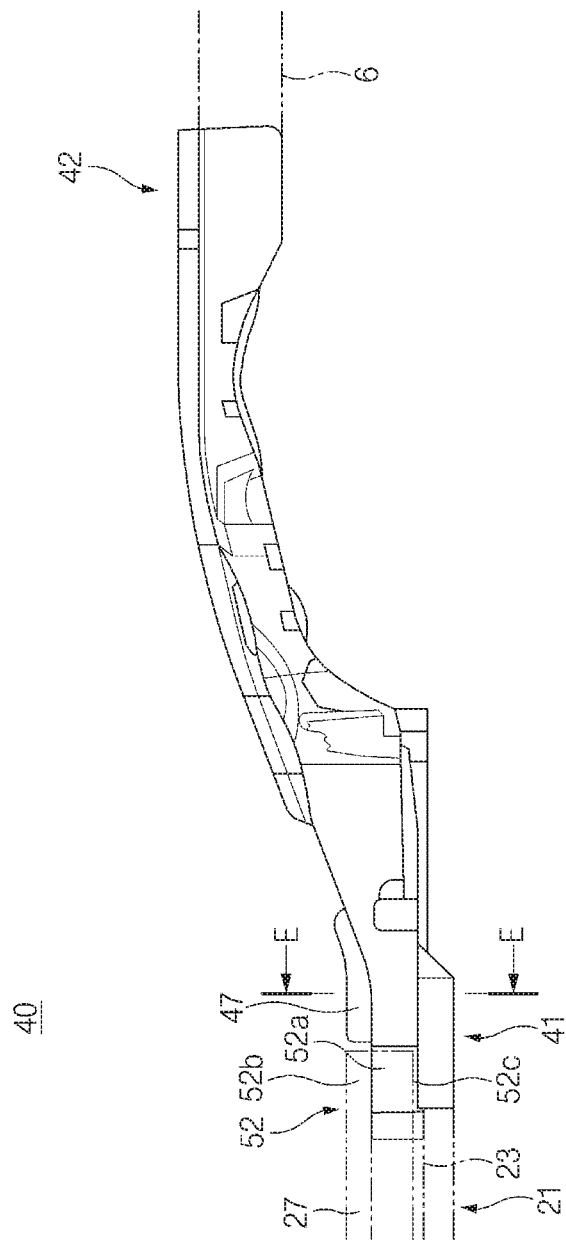
FIG. 13 illustrates a view in a direction of arrow D of FIG. 12.
Figure 17:
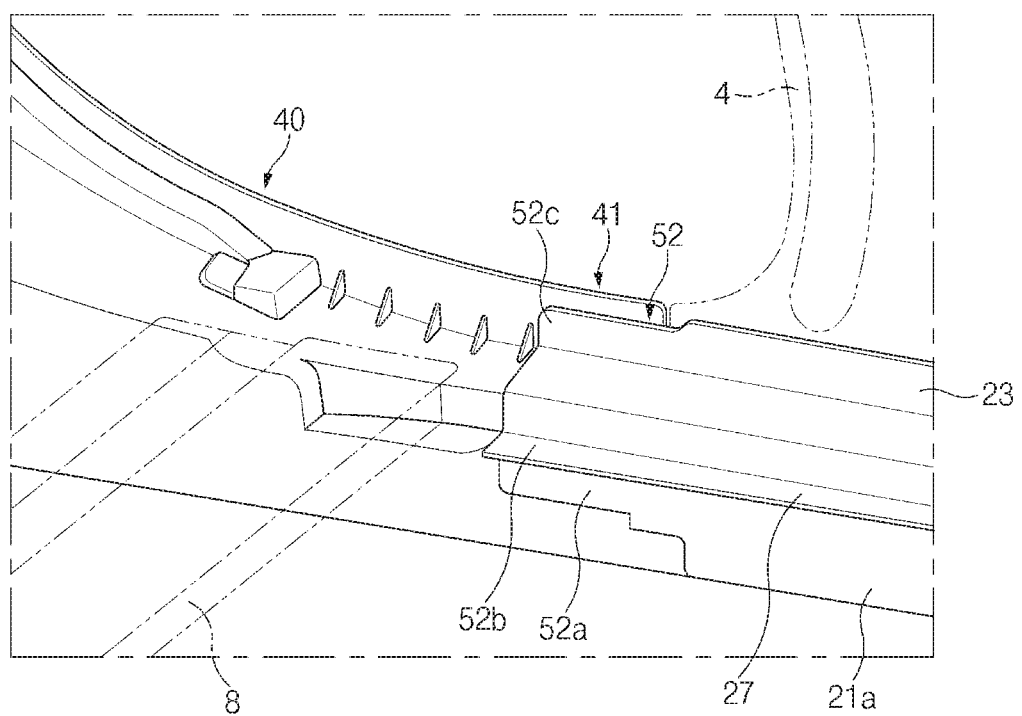
FIG. 17 illustrates a view in a direction of arrow H of FIG. 16.

As illustrated in FIG. 17, the rear extension 52 may include a first extension portion 52a extending from the inboard side portion 21a of the inner side sill 21 toward the rear of the vehicle, a second extension portion 52b extending from the matching flange 27 of the inner side sill 21 toward the rear of the vehicle, and a third extension portion 52c extending from the top flange 23 of the inner side sill 21 toward the rear of the vehicle. As illustrated in FIGS. 13 and 17, the rear extension 52 of the inner side sill 21 may abut and overlap an inboard side portion of a third connection portion 41 of the rear connection member 40, and the rear extension 52 of the inner side sill 21 may be coupled to the third connection portion 41 of the rear connection member 40 by welding and/or using fasteners.

According to an exemplary embodiment, the inner side sill 21 may be an extruded product which is produced by an extrusion process, and thus the inboard side portion 21a, the outboard side portion 21b, the plurality of ribs 21c and 21d, the inner extension rib 28, 28a, or 28b, the front extension 51, and the rear extension 52 may be formed as a unitary one-piece structure.

Referring to FIGS. 1 and 2, the front connection members 30 may be connected to the front ends of the side sills 20, respectively.

A pair of front side members 5 may be located at a front side of the pair of side sills 20, respectively. The pair of front side members 5 may be connected to the front ends of side sills 20, respectively. The pair of front side members 5 may be spaced apart along the transverse direction of the vehicle 1, each front side member 5 may extend along the longitudinal direction of the vehicle 1.

The front connection members 30 may connect front side members 5 to the inner side sills 21 of the corresponding side sills 20, respectively.

The front connection member 30 may include a first connection portion 31 to which a rear end of the front side member 5 is connected, and the second connection portion 32 to which the front end of the inner side sill 21 is connected.

An axis X2 of the side sill 20 may be offset from an axis X1 of the front side member 5 by a predetermined distance toward the outside of the vehicle, and accordingly an axis X4 of the second connection portion 32 may be offset from an axis X3 of the first connection portion 31 toward the outside of the vehicle.

Figure 5:
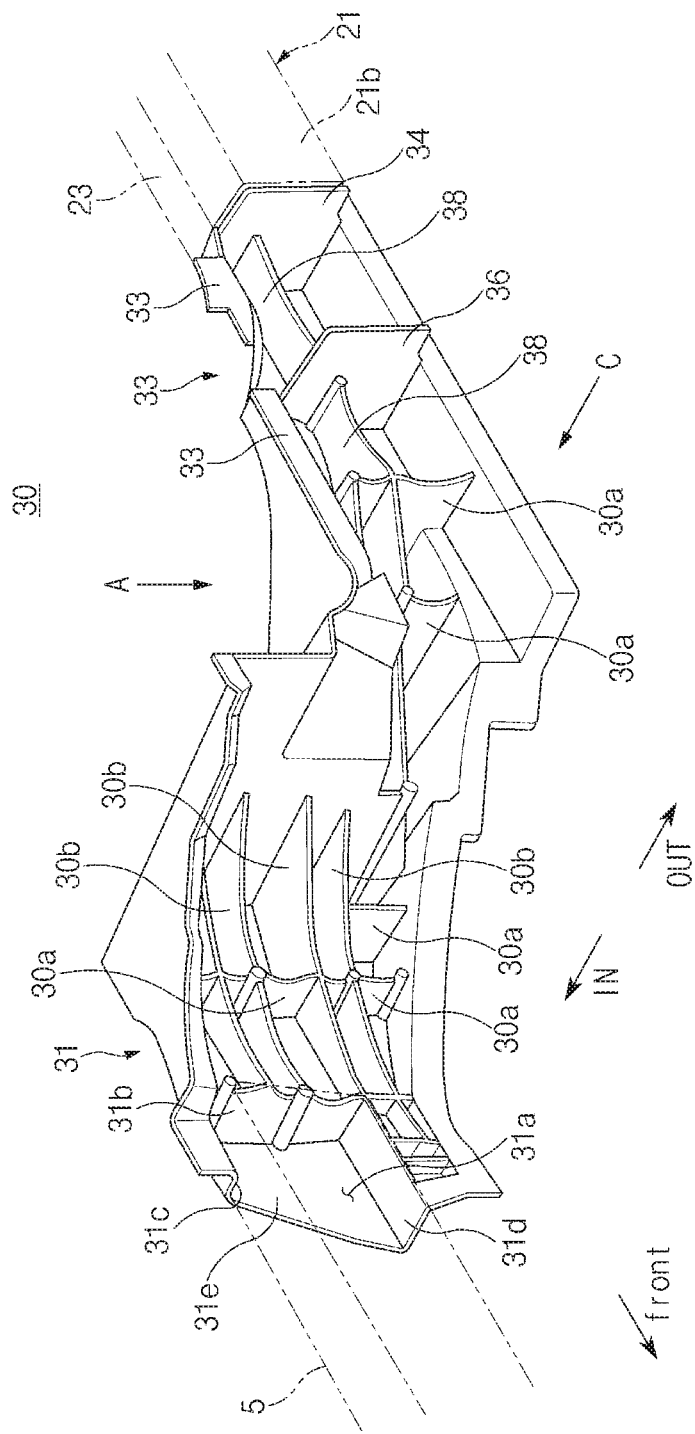
FIG. 5 illustrates a perspective view of a front connection member in a side sill structure for a vehicle according to an exemplary embodiment of the present disclosure.
Figure 8:
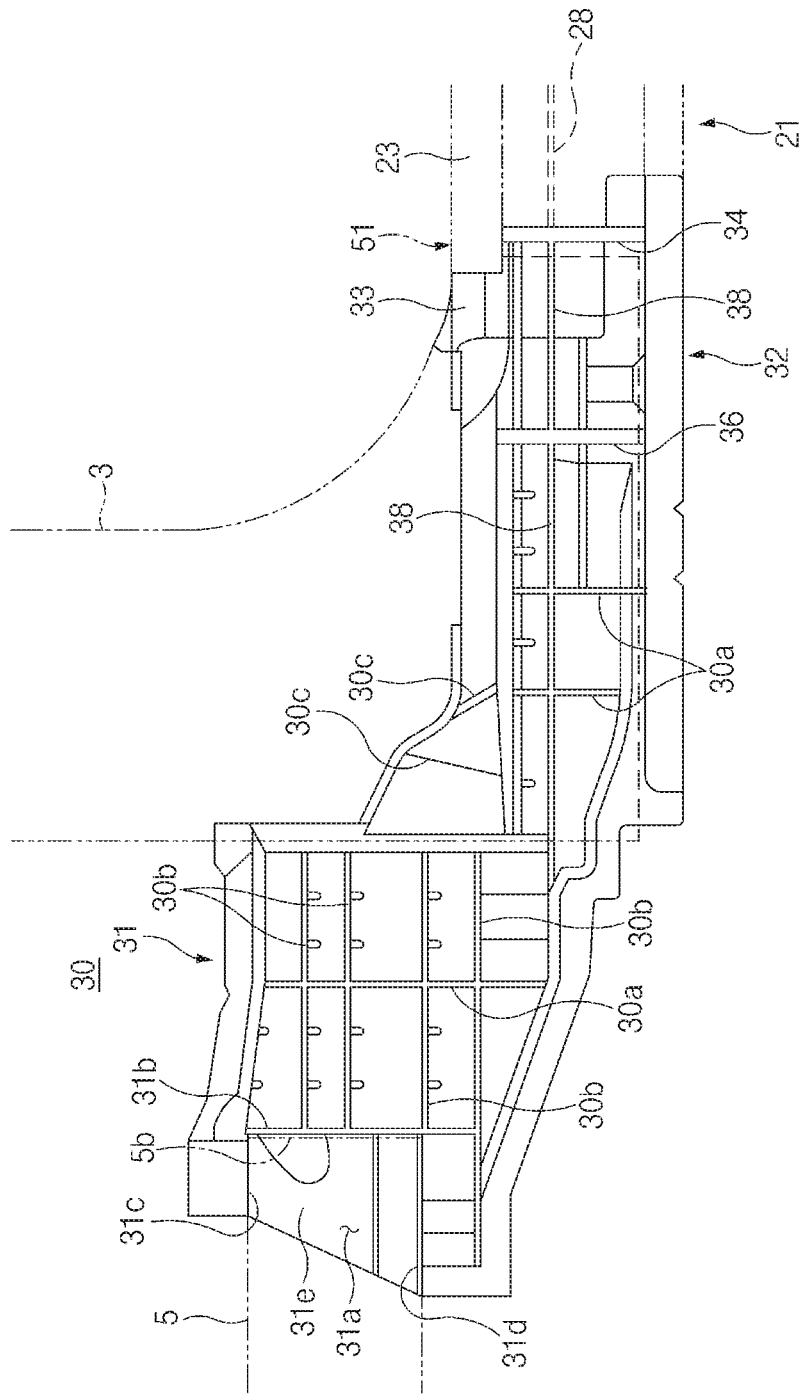
FIG. 8 illustrates a view in a direction of arrow C of FIG. 5.

Referring to FIGS. 5 and 8, the front connection member 30 may have a plurality of ribs 30a, 30b, and 30c disposed in the inside thereof. The plurality of ribs 30a, 30b, and 30c may include a plurality of vertical ribs 30a extending vertically, a plurality of horizontal ribs 30b extending horizontally, and a plurality of inclined ribs 30c extending obliquely. At least some of the vertical ribs 30a, the horizontal ribs 30b, and the inclined ribs 30c may be connected to each other.

Referring to FIGS. 5 and 8, the first connection portion 31 may have a receiving space 31a in which the rear end of the front side member 5 is received, and the receiving space 31a may be provided at the front end of the first connection portion 31. The receiving space 31a may be defined by a support wall 31b, an upper wall 31c, a lower wall 31d, and a side wall 31e. In particular, the support wall 31b may be a plane orthogonal to the axis X1 of the front side member 5, and a rear end face 5b of the front side member 5 may contact the support wall 31b of the receiving space 31a. Thus, the support wall 31b of the receiving space 31a may support the rear end face 5b of the front side member 5. The rear end of the front side member 5 may be received in the receiving space 31a of the first connection portion 31, and the rear end of the front side member 5 may be coupled to the first connection portion 31 by welding and/or using fasteners.

As the rear end face 5b of the front side member 5 contacts the support wall 31b, the rear end face 5b of the front side member 5 may be supported by the support wall 31b. The plurality of horizontal ribs 30b may be integrally connected to the support wall 31b so that support stiffness of the support wall 31b may be reinforced by the plurality of horizontal ribs 30b. As the rear end face 5b of the front side member 5 contacts the support wall 31b of the first connection portion 31, an impact load generated in a frontal collision of the vehicle may be transmitted from the front side member 5 to the inner side sill 21 through the support wall 31b, the horizontal ribs 30b and the vertical ribs 30a of the front connection member 30, and an impact load generated in a rear collision of the vehicle may be transmitted from the inner side sill 21 to the front side member 5 through the horizontal ribs 30b, the vertical ribs 30a, and the support wall 31b of the front connection member 30.

Referring to FIGS. 5 and 6, the second connection portion 32 may include an outer support wall 34 which contacts the front end of the inner side sill 21. According to an exemplary embodiment, the outer support wall 34 may be a plane orthogonal to the axis X2 of the inner side sill 21, and in particular, the outer support wall 34 may extend vertically. The outer support wall 34 may have a cross-sectional shape which is substantially the same as an outer cross-sectional contour of the inner side sill 21.

The second connection portion 32 may further include at least one inner support wall 36 provided in the inside thereof. The inner support wall 36 may be spaced apart from the outer support wall 34, and the inner support wall 36 may be parallel to the outer support wall 34. According to an exemplary embodiment, the inner support wall 36 may extend vertically. The inner support wall 36 may have a cross-sectional shape which is substantially the same as the outer cross-sectional contour of the inner side sill 21.

Referring to FIGS. 6 and 7, the front connection member 30 may further include a matching flange 37 which is matched to the floor 2 of the vehicle, and the matching flange 37 may extend from an inboard side portion of the front connection member 30 toward the floor 2. As illustrated in FIG. 6, the matching flange 37 may extend from the inboard side portion of the second connection portion 32 in a diagonal direction. The matching flange 37 of the front connection member 30 may be coupled to the floor 2 by welding and/or using fasteners. In particular, the matching flange 37 may extend horizontally to match and couple with the floor 2 so that the matching flange 37 of the front connection member 30 may be firmly coupled to the floor 2 of the vehicle 1.

The second connection portion 32 may further include an inner extension rib 38 which is substantially flush with the matching flange 37, and the inner extension rib 38 may extend horizontally in a width direction of the second connection portion 32. In addition, the inner extension rib 38 may extend horizontally along the axis X4 of the second connection portion 32. The inner extension rib 38 may extend through the outer support wall 34 and the inner support wall 36 so that the inner extension rib 38 may integrally connect the outer support wall 34 and the inner support wall 36. The outer support wall 34 may be connected to the inner support wall 36 through the inner extension rib 38 to thereby facilitate the transmission of the load and significantly increase stiffness of the front connection member 30.

Figure 7A:
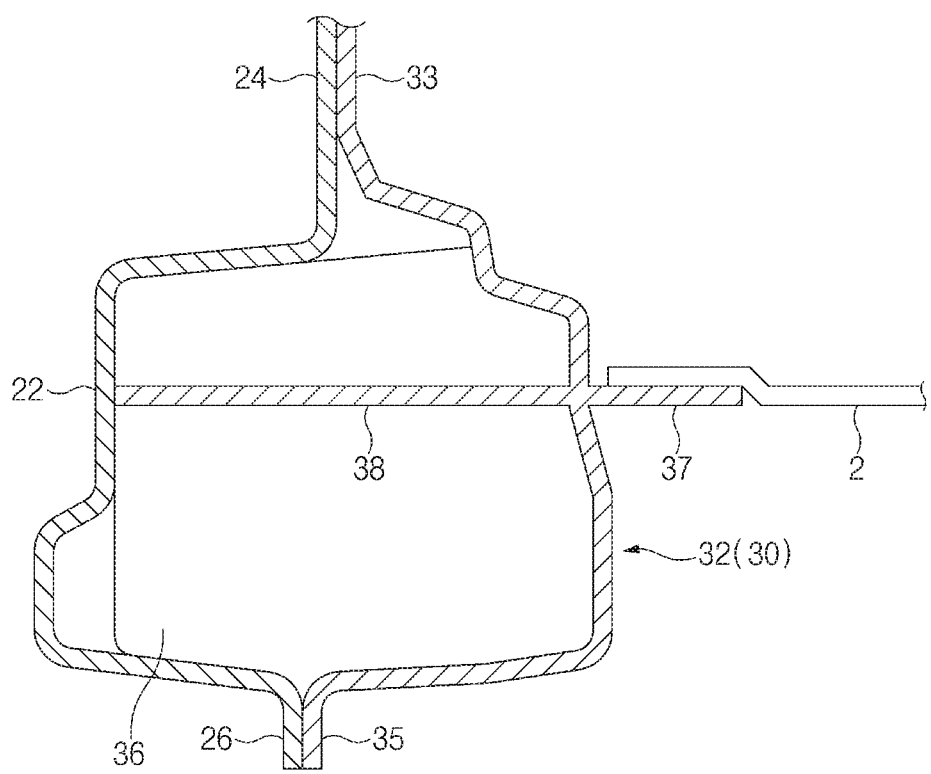
FIG. 7A illustrates a cross-sectional view taken along line B-B of FIG. 6.

According to an exemplary embodiment, the inner extension rib 38 may be flush with the matching flange 37 as illustrated in FIG. 7A.

Figure 7B:
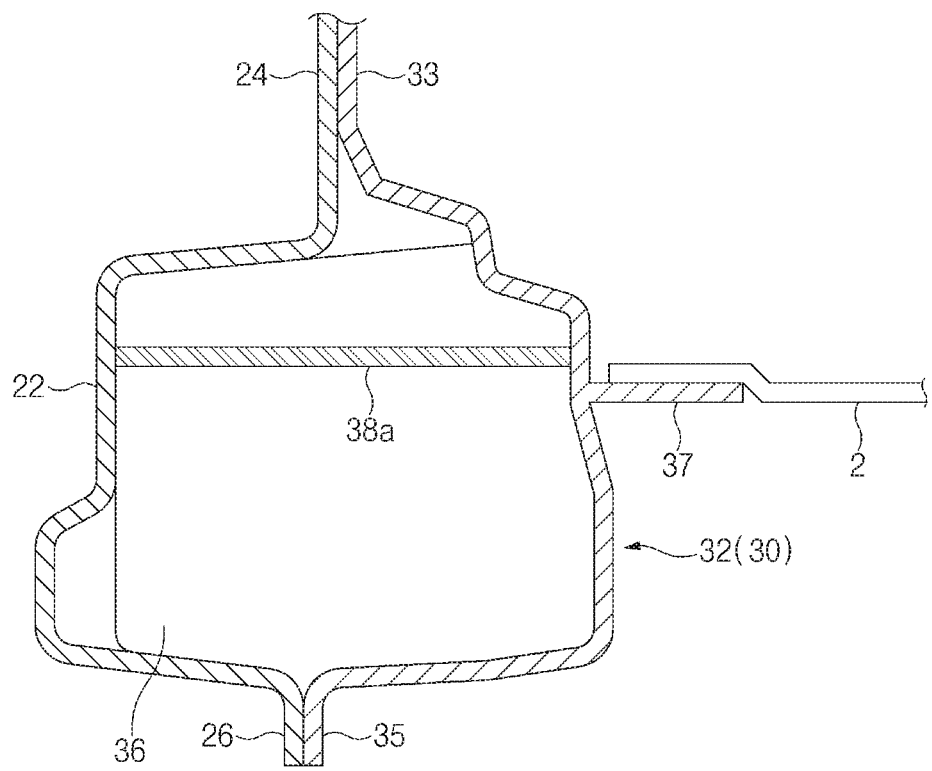
FIG. 7B illustrates a cross-sectional view according to a modified embodiment of FIG. 7A.

According to another exemplary embodiment, an inner extension rib 38a may be offset upwardly with respect to the matching flange 37 by a predetermined distance as illustrated in FIG. 7B.

Figure 7C:
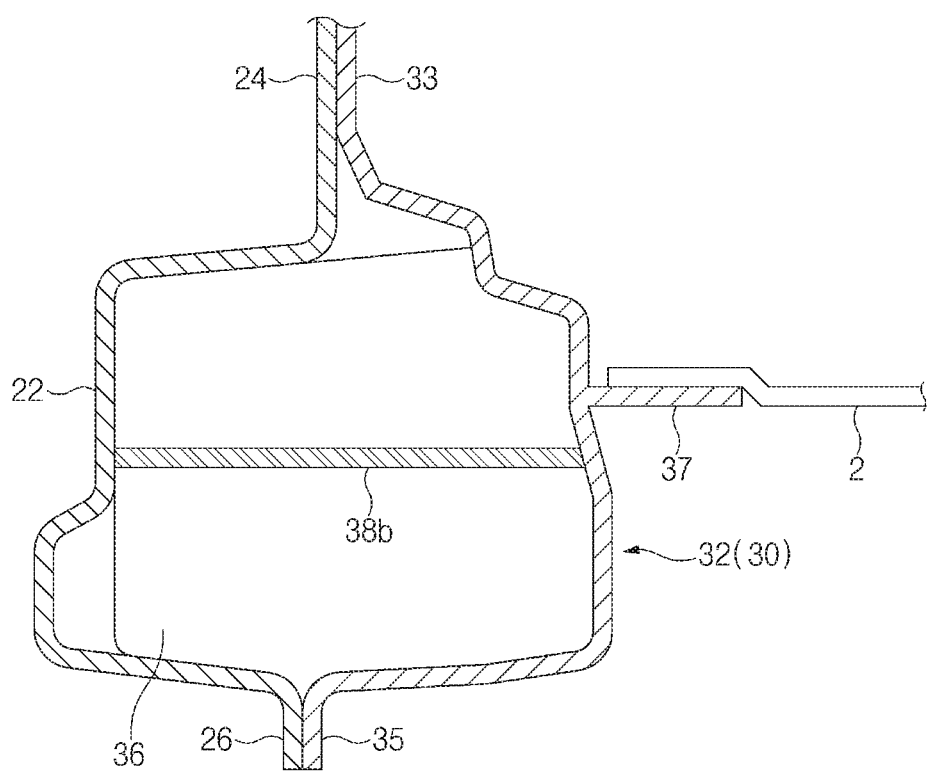
FIG. 7C illustrates a cross-sectional view according to another modified embodiment of FIG. 7A.

According to another exemplary embodiment, an inner extension rib 38b may be offset downwardly with respect to the matching flange 37 by a predetermined distance as illustrated in FIG. 7C.

Figure 9:
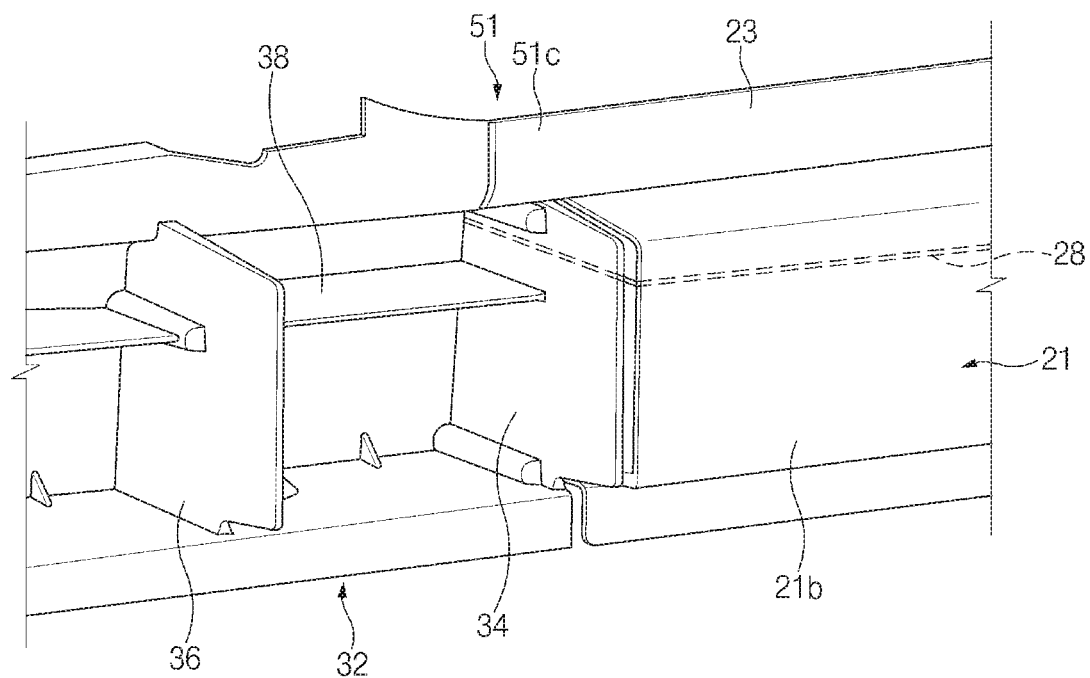
FIG. 9 illustrates a perspective view of a structure in which a second connection portion of a front connection member and a front end of an inner side sill are connected in a side sill structure for a vehicle according to an exemplary embodiment of the present disclosure, which is viewed from the outside of the side sill structure.

The inner side sill 21 and the front connection member 30 may be coupled to the flat floor 2, and accordingly the matching flange 37 of the front connection member 30 may be substantially flush with the matching flange 27 of the inner side sill 21. As illustrated in FIGS. 8 and 9, the inner extension rib 38 of the front connection member 30 may be substantially flush with the inner extension rib 28 of the inner side sill 21. Thus, impact energy generated in the frontal collision of the vehicle may be effectively distributed and transmitted from the front connection member 30 to the inner side sill 21, and connection stiffness between the front connection member 30 and the inner side sill 21 may be significantly increased.

Referring to FIG. 8, the second connection portion 32 may extend to a lower rear end of a front pillar 3 such as an A-pillar, and thus the lower end of the front pillar 3 may be coupled to the second connection portion 32.

Referring to FIG. 7A, the front connection member 30 may have a top flange 33 extending upwardly from a top end thereof and a bottom flange 35 extending downwardly a bottom end thereof, and the top and bottom flanges 33 and 35 may extend vertically. The top and bottom flanges 24 and 26 of the outer side sill 22 may be coupled to the top and bottom flanges 33 and 35 of the second connection portion 32 by welding and/or using fasteners, respectively. As illustrated in FIGS. 10 and 11, the third extension portion 51c of the first extension 51 of the inner side sill 21 may be coupled to the top flange 33 of the second connection portion 32.

As illustrated in FIGS. 3 and 8, the second connection portion 32 of the front connection member 30 may extend to the lower rear end of the front pillar 3 such as an A-pillar, and thus the front pillar 3 may be coupled to an outboard side portion of the second connection portion 32 of the front connection member 30 to thereby increase side stiffness of the vehicle.

Referring to FIGS. 9 to 11, the front extension 51 of the inner side sill 21 may be coupled to the second connection portion 32 of the front connection member 30 by welding and/or using fasteners. Thus, the front end of the inner side sill 21 may be firmly coupled to the second connection portion 32 of the front connection member 30. In particular, as the outer support wall 34 of the second connection portion 32 contacts the front end of the inner side sill 21, the impact load in the frontal collision of the vehicle may be uniformly transmitted from the front side member 5 to the side sill 20 through the outer support wall 34 of the second connection portion 32 and the front end of the inner side sill 21.

As illustrated in FIG. 1, a battery 8 may be mounted on the floor 2 of the vehicle 1, and the front of the battery 8 may be protected by the front connection members 30.

According to an exemplary embodiment, the front connection member 30 may be a cast product which is produced by a casting process, and thus the first connection portion 31, the second connection portion 32, the plurality of ribs 30a and 30b, the matching flange 37, and the inner extension rib 38, 38a, or 38b may be formed as a unitary one-piece structure.

Since the first connection portion 31, the second connection portion 32, the plurality of ribs 30a and 30b, and the inner extension rib 38 of the front connection member 30 are formed as the unitary one-piece structure, and the second connection portion of the front connection member 30 and the inner side sill 21 are firmly connected, the second connection portion of the front connection member 30 and the inner side sill 21 may not be separated from each other in the event of the frontal collision of the vehicle, and thus damage to the battery 8 may be prevented.

Referring to FIGS. 1 and 2, the rear connection members 40 may be connected to the rear ends of the side sills 20, respectively.

A pair of rear extension members 6 may be located at a rear side of the pair of side sills 20, respectively. The pair of rear extension members 6 may be connected to the rear ends of side sills 20, respectively. The pair of rear extension members 6 may be spaced apart along the transverse direction of the vehicle 1, each rear extension member 6 may extend along the longitudinal direction of the vehicle 1.

The rear connection members 40 may connect rear extension members 6 to the corresponding side sills 20, respectively.

In addition, the rear connection member 40 may have a shape corresponding to an outboard shape of a wheel house 7.

The rear connection member 40 may include the third connection portion 41 to which the rear end of the inner side sill 21 is connected, and a fourth connection portion 42 to which a front end of the rear extension member 6 is connected.

The axis X2 of the side sill 20 may be offset from an axis X5 of the rear extension member 6 by a predetermined distance toward the outside of the vehicle, and accordingly an axis X6 of the third connection portion 41 may be offset from an axis X7 of the fourth connection portion 42 toward the outside of the vehicle.

Figure 12:
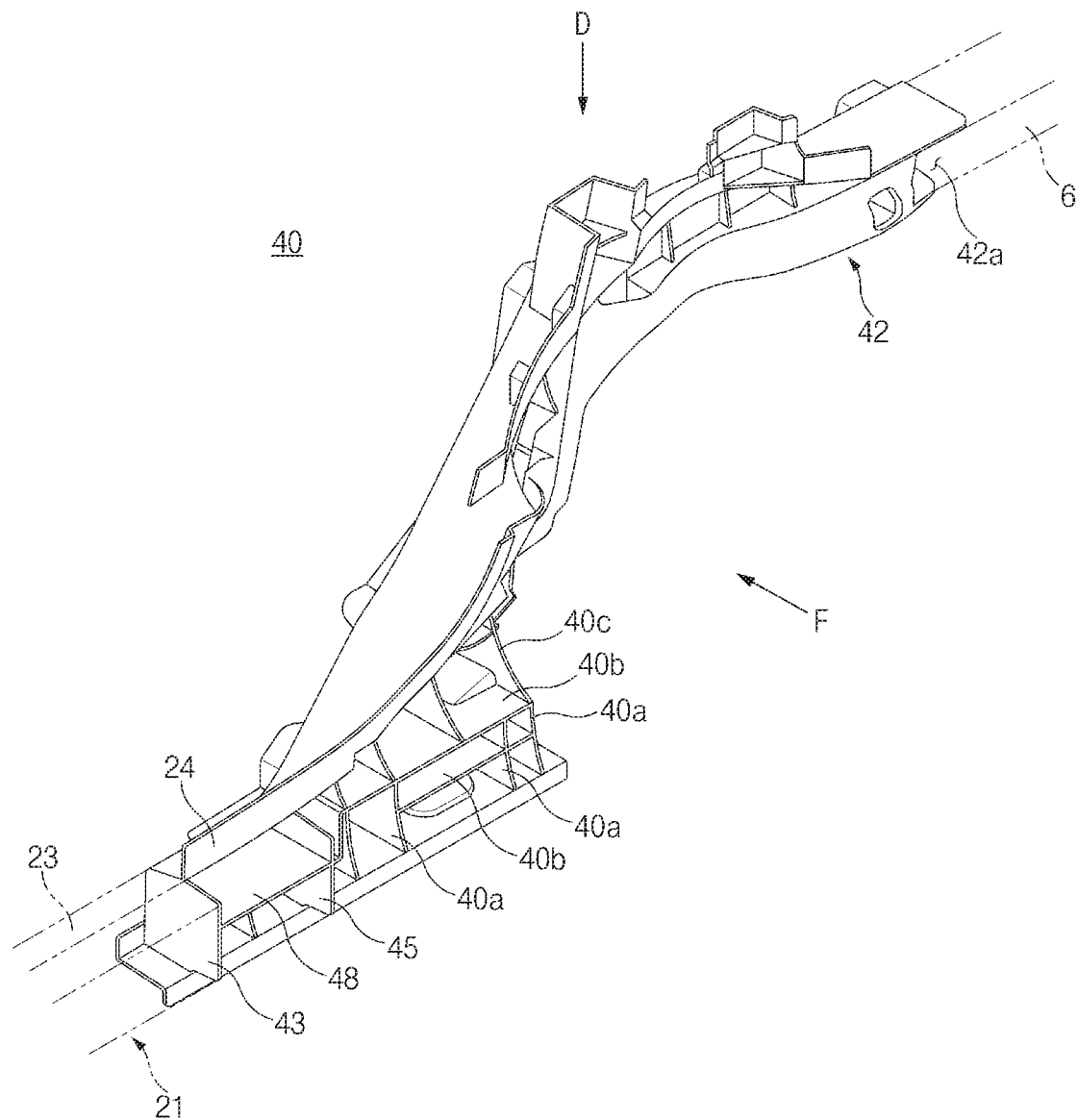
FIG. 12 illustrates a perspective view of a rear connection member in a side sill structure for a vehicle according to an exemplary embodiment of the present disclosure.
Figure 15:
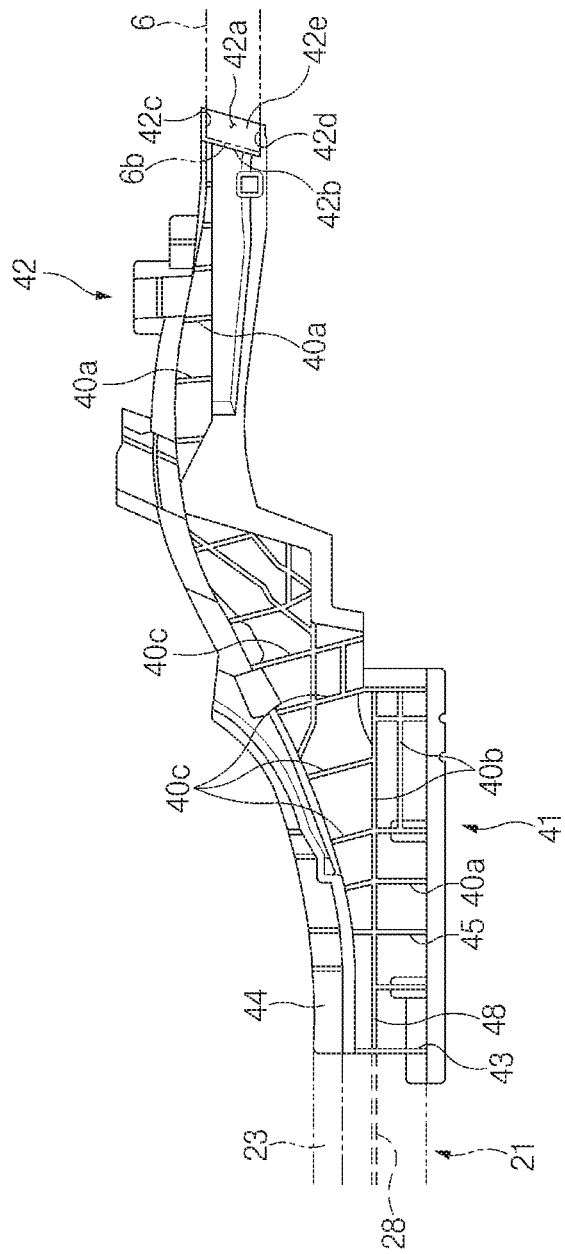
FIG. 15 illustrates a view in a direction of arrow F of FIG. 12.

Referring to FIGS. 12 and 15, the rear connection member 40 may have a plurality of ribs 40a, 40b, and 40c disposed in the inside thereof. The plurality of ribs 40a, 40b, and 40c may include a plurality of vertical ribs 40a extending vertically, a plurality of horizontal ribs 40b extending horizontally, and a plurality of inclined ribs 40c extending obliquely. At least some of the vertical ribs 40a, the horizontal ribs 40b, and the inclined ribs 40c may be connected to each other.

Referring to FIGS. 12 and 15, the third connection portion 41 may include an outer support wall 43 which contacts the rear end of the inner side sill 21. According to an exemplary embodiment, the outer support wall 43 may be a plane orthogonal to the axis X2 of the inner side sill 21, and in particular, the outer support wall 43 may extend vertically. The outer support wall 43 may have a cross-sectional shape which is substantially the same as the outer cross-sectional contour of the inner side sill 21.

The third connection portion 41 may further include at least one inner support wall 45 provided in the inside thereof. The inner support wall 45 may be spaced apart from the outer support wall 43, and the inner support wall 45 may be parallel to the outer support wall 43. According to an exemplary embodiment, the inner support wall 45 may extend vertically. The inner support wall 45 may have a cross-sectional shape which is substantially the same as the outer cross-sectional contour of the inner side sill 21.

Referring to FIGS. 13 and 14, the rear connection member 40 may further include a matching flange 47 which is matched to the floor 2 of the vehicle, and the matching flange 47 may extend from the inboard side portion of the third connection portion 41 toward the floor 2. The matching flange 47 of the rear connection member 40 may be coupled to the floor 2 by welding and/or using fasteners. In particular, the matching flange 47 may extend horizontally to match and couple with the floor 2. Thus, the rear connection member 40 may be firmly coupled to the floor 2 of the vehicle 1.

The third connection portion 41 may further include an inner extension rib 48 which is substantially flush with the matching flange 47. The inner extension rib 48 may extend horizontally in a width direction of the third connection portion 41. In addition, the inner extension rib 48 may extend horizontally along the axis X6 of the third connection portion 41. The inner extension rib 48 may extend to connect the outer support wall 43 and the inner support wall 45. Thus, the outer support wall 43 may be connected to the outer support wall 45 through the inner extension rib 48 to thereby facilitate the transmission of the load and significantly increase stiffness.

Figure 14A:
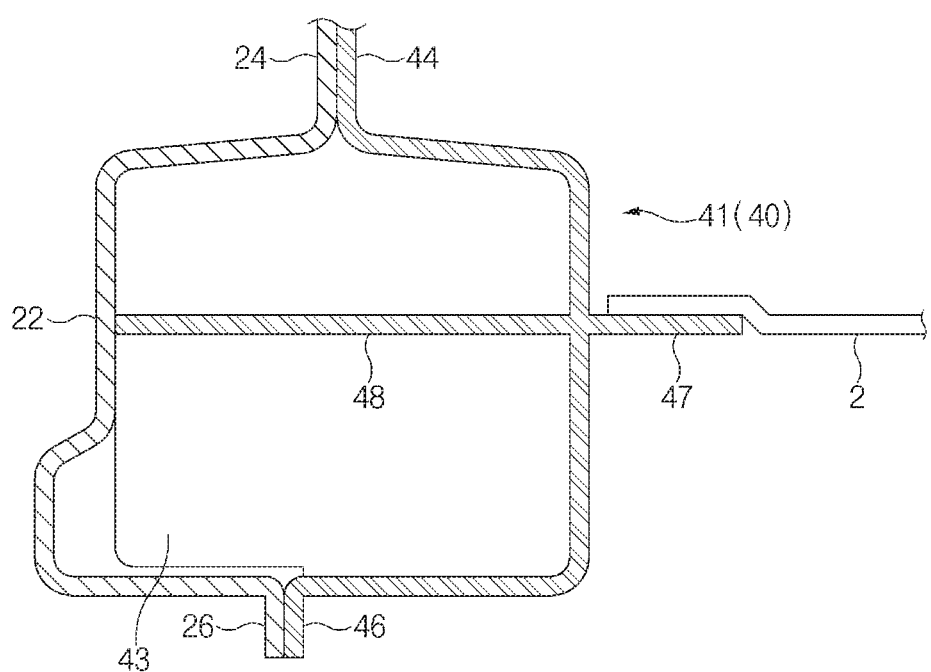
FIG. 14A illustrates a cross-sectional view taken along line E-E of FIG. 13.

According to an exemplary embodiment, the inner extension rib 48 may be flush with the matching flange 47 as illustrated in FIG. 14A.

Figure 14B:
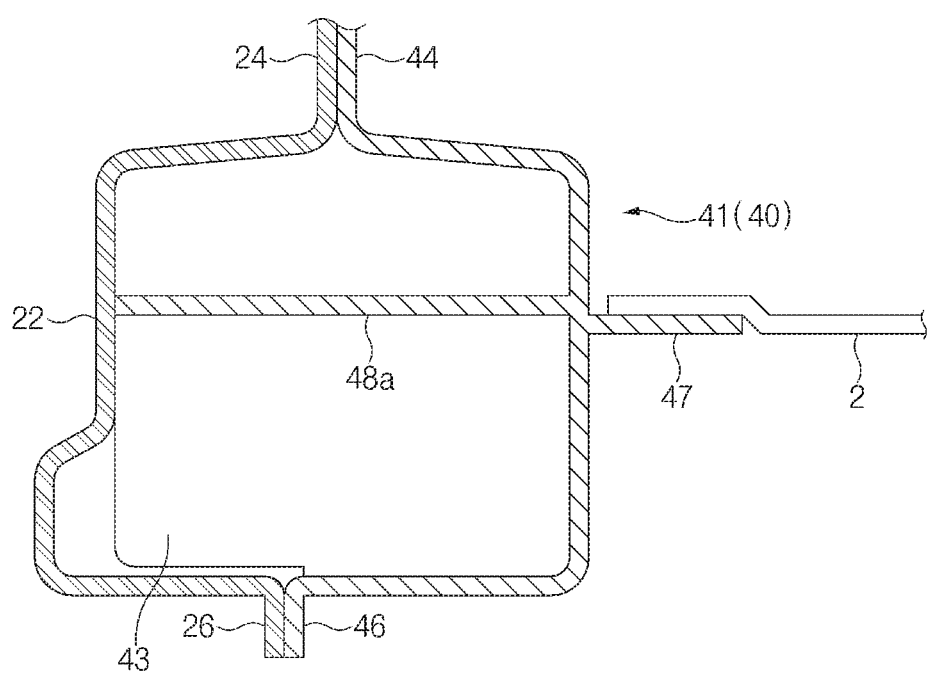
FIG. 14B illustrates a cross-sectional view according to a modified embodiment of FIG. 14A.

According to another exemplary embodiment, an inner extension rib 48a may be offset upwardly with respect to the matching flange 47 by a predetermined distance as illustrated in FIG. 14B.

Figure 14C:
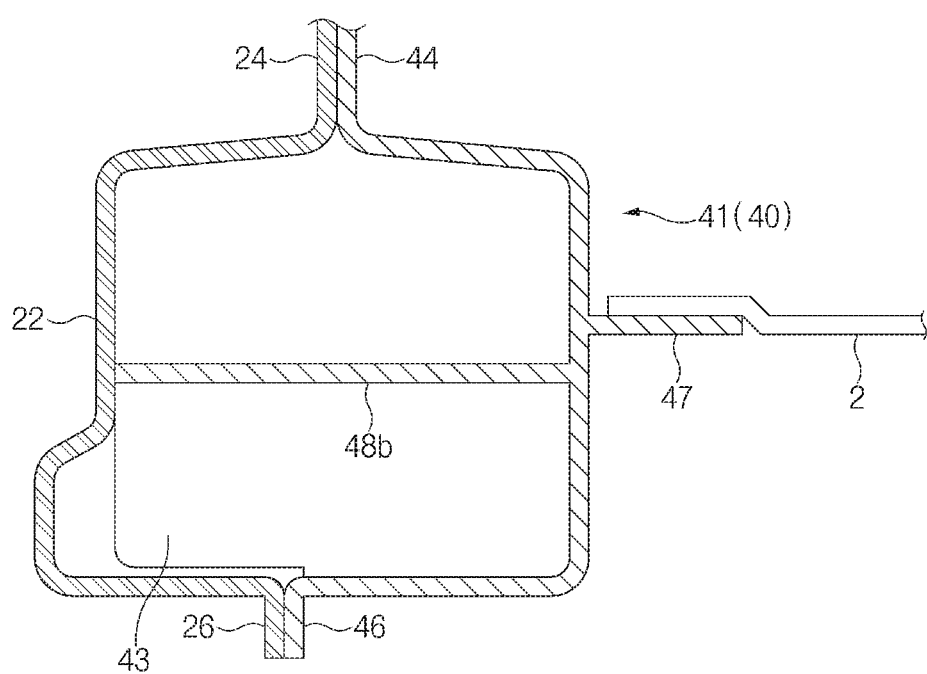
FIG. 14C illustrates a cross-sectional view according to another modified embodiment of FIG. 14A.

According to another exemplary embodiment, an inner extension rib 48b may be offset downwardly with respect to the matching flange 47 by a predetermined distance as illustrated in FIG. 14C.

Figure 16:
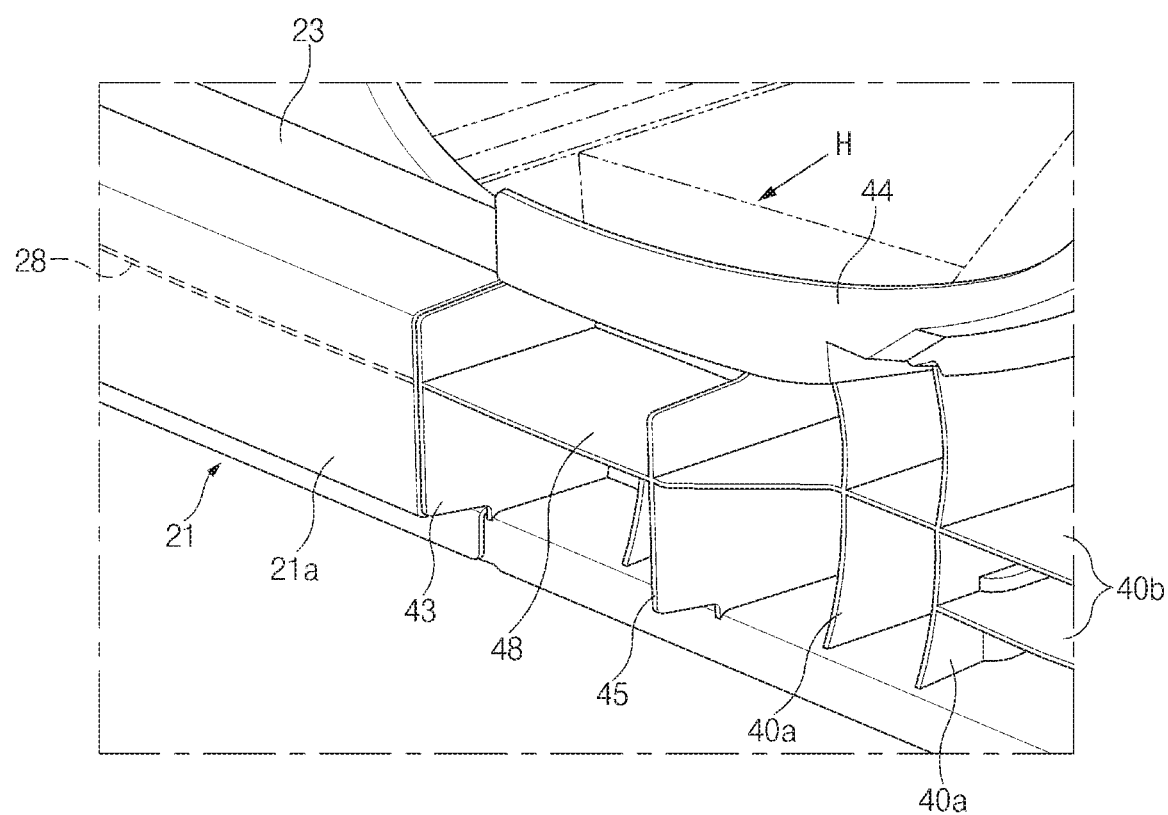
FIG. 16 illustrates a perspective view of a structure in which a third connection portion of a rear connection member and a rear end of an inner side sill are connected in a side sill structure for a vehicle according to an exemplary embodiment of the present disclosure, which is viewed from the outside of the side sill structure.

The inner side sill 21 and the rear connection member 40 may be coupled to the flat floor 2, and accordingly the matching flange 47 of the rear connection member 40 may be substantially flush with the matching flange 27 of the inner side sill 21. As illustrated in FIGS. 15 and 16, the inner extension rib 48 of the rear connection member 40 may be substantially flush with the inner extension rib 28 of the inner side sill 21. Thus, impact energy generated in the frontal collision of the vehicle may be effectively distributed and transmitted from the inner side sill 21 to the rear connection member 40, and connection stiffness between the inner side sill 21 and the rear connection member 40 may be significantly increased.

Referring to FIGS. 12 and 15, the fourth connection portion 42 may have a receiving space 42a in which the front end of the rear extension member 6 is received, and the receiving space 42a may be provided at the front end of the fourth connection portion 42. The receiving space 42a may be defined by a support wall 42b, an upper wall 42c, a lower wall 42d, and a side wall 42e. In particular, the support wall 42b may be a plane substantially orthogonal to the axis X5 of the rear extension member 6, and a front end face 6b of the rear extension member 6 may contact the support wall 42b of the receiving space 42a. The front end of the rear extension member 6 may be received in the receiving space 42a of the fourth connection portion 42, and the front end of the rear extension member 6 may be coupled to the fourth connection portion 42 by welding and/or using fasteners.

As the front end face 6b of the rear extension member 6 contacts the support wall 42b, the front end face 6b of the rear extension member 6 may be supported by the support wall 42b. The vertical ribs 40a and the horizontal ribs 40b may be integrally connected to the support wall 42b so that support stiffness of the support wall 42b may be reinforced by the vertical ribs 40a and the horizontal ribs 40b. As the front end face 6b of the rear extension member 6 contacts the support wall 42b of the fourth connection portion 42, an impact load generated in a frontal collision of the vehicle may be transmitted from the inner side sill 21 to the rear extension member 6 through the horizontal ribs 40b, the vertical ribs 40a, and the support wall 42b of the rear connection member 40, and an impact load generated in a rear collision of the vehicle may be transmitted from the rear extension member 6 to the inner side sill 21 through the support wall 42b, the horizontal ribs 40b, and the vertical ribs 40a of the rear connection member 40.

The fourth connection portion 42 may have a curved shape corresponding to the outboard shape of the rear wheel house 7 of the vehicle.

Referring to FIGS. 16 and 17, the front end of the third connection portion 41 may extend to a lower rear end of a center pillar 4 such as a B-pillar or a front end of a rear crossmember 7 located on the rear of the floor 2, and a lower portion of the center pillar 4 may be coupled to the outboard side portion of the rear end of the side sill 20.

Referring to FIG. 14A, the rear connection member 40 may have a top flange 44 extending upwardly from a top end thereof and a bottom flange 46 extending downwardly from a bottom end thereof, and the top and bottom flanges 44 and 46 may extend vertically. The top and bottom flanges 24 and 26 of the outer side sill 22 may be coupled to the top and bottom flanges 44 and 46 of the rear connection member 40 by welding and/or using fasteners, respectively. As illustrated in FIG. 17, the third extension portion 52c of the rear extension 52 of the inner side sill 21 may be coupled to the top flange 44 of the rear connection member 40 by welding and/or using fasteners.

Referring to FIGS. 13 and 17, the rear extension 52 of the inner side sill 21 may abut and overlap the inboard side portion of the third connection portion 41, and the rear extension 52 of the inner side sill 21 may be coupled to the third connection portion 41 of the rear connection member 40 by welding and/or using fasteners. Thus, the rear end of the inner side sill 21 may be firmly coupled to the third connection portion 41 of the rear connection member 40.

According to an exemplary embodiment, the rear connection member 40 may be a cast product which is produced by a casting process, and thus the third connection portion 41, the fourth connection portion 42, the plurality of ribs 40a and 40b, and the inner extension rib 48, 48a, or 48b may be formed as a unitary one-piece structure.

As set forth above, according to exemplary embodiments of the present disclosure, by forming the inner side sill 21 integrated with the plurality of ribs 21c and 21d and the inner extension rib 28 as the extruded product by the extrusion process, forming the front connection member 30 integrated with the plurality of ribs 30a and 30b and the inner extension rib 38 as the cast product by the casting process, and forming the rear connection member 40 integrated with the plurality of ribs 40a and 40b and the inner extension rib 48 as the cast product by the casting process, the stiffness of the vehicle on both sides of the floor may be significantly increased so that the entire interior space of the vehicle may be stably protected.

In addition, according to exemplary embodiments of the present disclosure, as the inner side sill 21 is formed as the extruded product, and the front connection member 30 and the rear connection member 40 are formed as the cast products, the weight and cost of the side sill structure may significantly be reduced compared to a side sill structure according to the related art.

According to exemplary embodiments of the present disclosure, as the front end of the inner side sill is firmly connected to the second connection portion of the front connection member, and in particular, as the outer support wall of the second connection portion contacts the front end of the inner side sill, the impact load generated in the frontal collision of the vehicle may be uniformly transmitted from the front side member to the side sill through the outer support wall of the second connection portion and the front end of the inner side sill.

According to exemplary embodiments of the present disclosure, as the plurality of ribs extending in the longitudinal direction of the inner side sill are provided within the inner side sill, the stiffness of the vehicle against side collisions may also be significantly improved.

According to exemplary embodiments of the present disclosure, by forming the inner side sill integrated with the plurality of ribs and the inner extension rib as the extruded product by the extrusion process, forming the front connection member integrated with the plurality of ribs and the inner extension rib as the cast product by the casting process, and forming the rear connection member integrated with the plurality of ribs and the inner extension rib as the cast product by the casting process, the stiffness of the vehicle on both sides of the floor may be significantly increased so that the entire interior space of the vehicle may be stably protected.

In addition, according to exemplary embodiments of the present disclosure, as the inner side sill is formed as the extruded product, and the front connection member and the rear connection member are formed as the cast products, the weight and cost of the side sill structure may significantly be reduced compared to the related art side sill structure. In addition, according to exemplary embodiments of the present disclosure, as the second connection portion of the front connection member and the inner side sill are firmly connected, the second connection portion of the front connection member and the inner side sill may not be separated from each other in the event of the frontal collision, and thus damage to the battery may be prevented.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A side sill structure for a vehicle, the side sill structure comprising: a side sill extending along a longitudinal direction of the vehicle; and a front connection member connecting between a front side member located at a front side of the side sill and a front end of the side sill; wherein the side sill comprises a matching flange that is coupled to a floor of the vehicle; wherein the side sill further comprises an inner extension rib that is substantially flush with the matching flange; and wherein the inner extension rib extends along a width of the side sill.

2. The side sill structure according to claim 1, wherein the front connection member comprises a matching flange that is coupled to the floor of the vehicle.

3. The side sill structure according to claim 2, wherein the front connection member further comprises an inner extension rib that is substantially flush with the matching flange.

4. The side sill structure according to claim 3, wherein the inner extension rib of the front connection member is substantially flush with the inner extension rib of the side sill.

5. The side sill structure according to claim 2, wherein the matching flange of the front connection member is substantially flush with the matching flange of the side sill.

6. The side sill structure according to claim 1, wherein the front connection member comprises a first connection portion connected to a rear end of the front side member, and a second connection portion connected to the front end of the side sill.

7. The side sill structure according to claim 6, wherein the second connection portion comprises an outer support wall that contacts the front end of the side sill, and wherein the outer support wall has a cross-sectional shape that is substantially the same as an outer cross-sectional contour of the side sill.

8. A side sill structure for a vehicle, the side sill structure comprising: a side sill extending along a longitudinal direction of the vehicle; and a rear connection member connecting between a rear end of the side sill and a rear extension member located at a rear side of the side sill; wherein the side sill comprises a matching flange that is coupled to a floor of the vehicle; wherein the side sill further comprises an inner extension rib that is substantially flush with the matching flange; and wherein the inner extension rib extends along a width of the side sill.

9. The side sill structure according to claim 8, wherein the rear connection member comprises a matching flange that is coupled to the floor of the vehicle.

10. The side sill structure according to claim 9, wherein the rear connection member further comprises an inner extension rib that is substantially flush with the matching flange.

11. The side sill structure according to claim 10, wherein the inner extension rib of the rear connection member is substantially flush with the inner extension rib of the side sill.

12. The side sill structure according to claim 9, wherein the matching flange of the rear connection member is substantially flush with the matching flange of the side sill.

13. The side sill structure according to claim 8, wherein the rear connection member comprises a third connection portion connected to the rear end of the side sill, and a fourth connection portion connected to a front end of the rear extension member.

14. The side sill structure according to claim 13, wherein the third connection portion comprises an outer support wall that contacts the rear end of the side sill, and wherein the outer support wall has a cross-sectional shape that is substantially the same as an outer cross-sectional contour of the side sill.

* * * * *